July 25, 1939.　　　F. W. BURGER　　　2,167,102
WHEEL
Filed Aug. 8, 1935　　　2 Sheets-Sheet 1
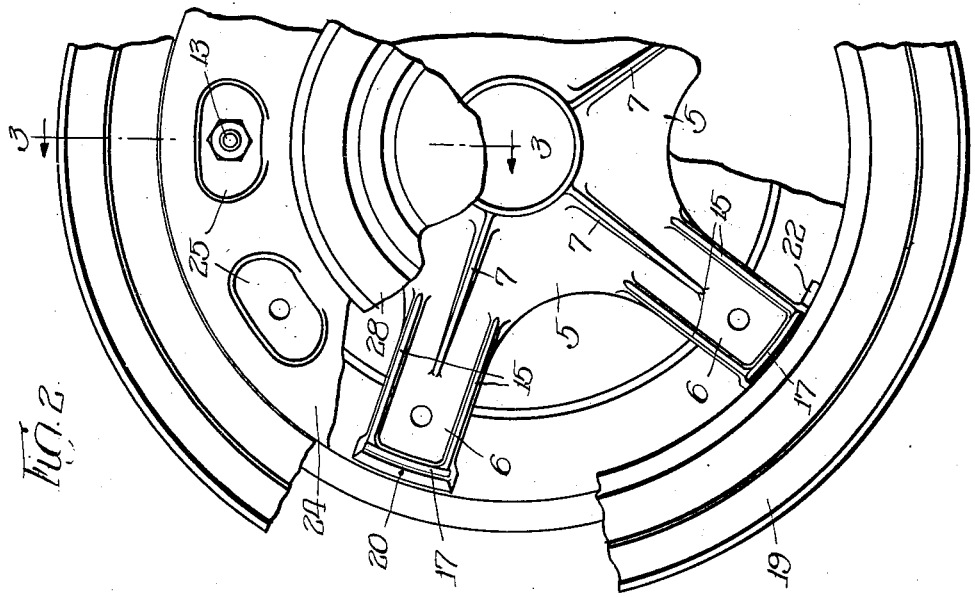
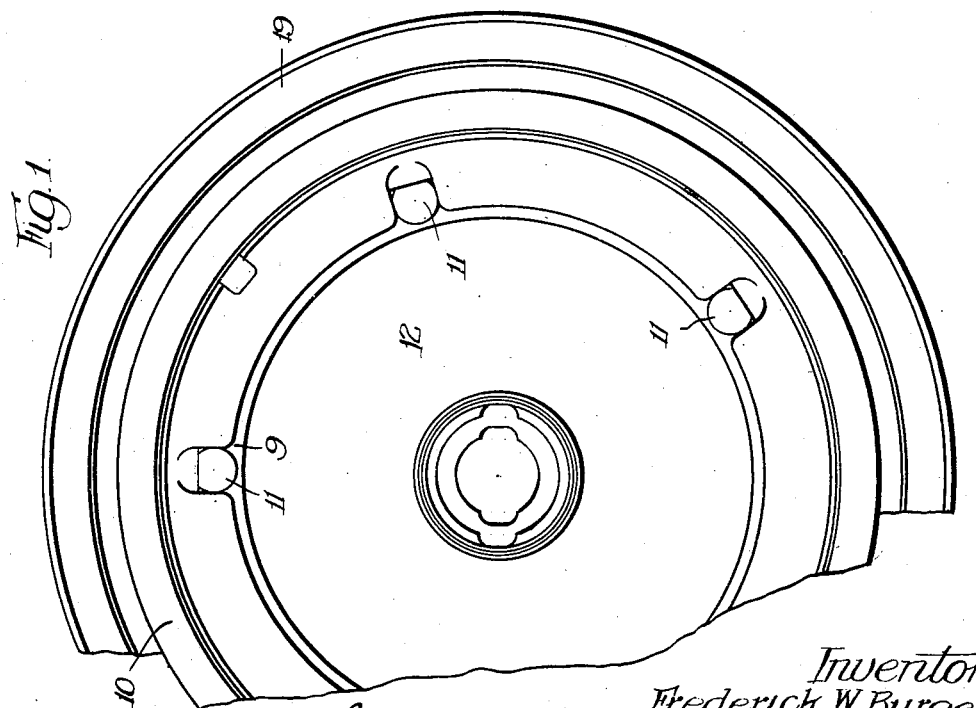
Inventor:
Frederick W. Burger.

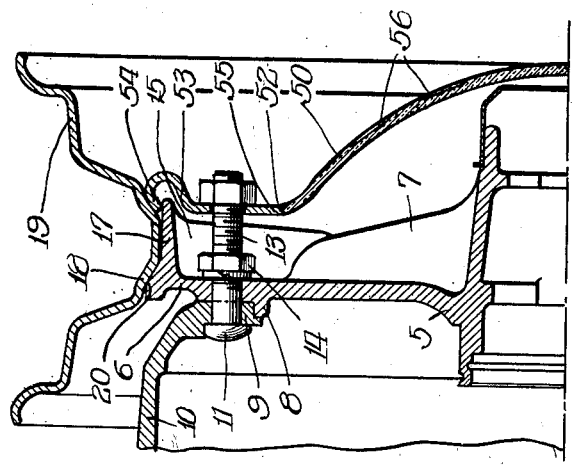

Patented July 25, 1939

2,167,102

UNITED STATES PATENT OFFICE 2,167,102

WHEEL

Frederick W. Burger, Niles, Mich., assignor Clark Equipment Company, Buchanan, Mich., a corporation of Michigan Application August 8, 1935, Serial No. 35,298

10 Claims. (Cl. 301—22)

The present invention relates generally to wheels for automotive vehicles and the like, and has particular reference to a wheel construction for mounting a drop center or beveled-edge type of rim in fixed lateral and radial position thereon.

It has heretofore been the practice to mount such rims either by means of a plurality of clamping lugs to the spoke ends of a wheel body, or to make the rim integral with a wire spoked wheel, as by welding or the like. However, I propose to produce a wheel assembly of this type in which the rim is supported on the spoke ends of a wheel body by an annular wedging ring member which, at the same time, provides a closure member for the outboard side of the wheel. This results in producing a wheel having a pleasing external appearance, which may be easily kept clean, and which is capable of rapid and accurate assembly, preferably without the use of independent clamping lugs or clamping bolts.

In its preferred embodiment, the present invention provides a wheel body having spoke ends provided with inclined wedge surfaces engaged by one beveled surface of the channel of a drop center type of rim, and a separate annular plate member provided with an inwardly extending peripheral beveled flange engaging the opposite bevel surface of the rim, whereby clamping of the plate member to the wheel body results in chording the rim radially outwardly of the wheel body. This results in positive lateral and radial alinement of the rim on the wheel body.

In another embodiment of my invention I provide for positioning a beveled edge type of rim upon the spoke ends of a wheel spider in either an overhanging or inwardly extending position. The rim, in one position, is chorded upon the inclined beveled surface of the spoke ends by the closure plate in an inwardly extending position, and in the other position the rim is chorded upon the wedge surface of the closure member in an outwardly extending position.

The invention also lends itself to the mounting upon the same wheel body of an irregular drop center type of rim wherein the rim comprises, on its inboard side, a beveled surface adapted to engage a corresponding beveled surface on the spoke ends of a wheel spider. The rim is maintained in a fixed lateral and axial position by the flange formed around the periphery of an annular closure plate, the flange being adapted to have engagement with the irregular lateral inwardly extending portion of the rim. The annular plate member is secured to the wheel in a manner similar to that previously referred to in connection with the preferred embodiment of my invention.

In another embodiment of my invention I provide a flexible resilient preformed hub cap made of rubber, a molded composition, fiber, or any other suitable material or composition which may be coated to simulate any desired external appearance, and adapted to be molded into or clipped to the annular clamping ring. This avoids denting and scraping of the hub cap when it comes in contact with a curb or the like, since a rubber hub cap will yield under pressure. In addition, the cost of such a hub cap is small, and it may be readily removed and economically replaced when desired.

One of the objects of the present invention is the provision of a single bolt for clamping the brake drum and the closure plate to the wheel spider, whereby the necessity of separate clamping lugs and bolts for these members is eliminated.

Another primary object of my invention resides in the provision of an annular closure plate disposed on the outboard side of the wheel which functions as a wedging means to maintain the rim upon the spoke ends of a wheel spider in fixed relative position. This wedge means, when used with a drop center type of rim, comprises an axially inwardly extending tapered flange formed about the peripheral edge of the annular plate member, which functions to move the rim laterally into engagement with tapered shoulders on the spoke ends of the wheel spider for moving the rim into fixed lateral position on the wheel body and then chording the rim radially outwardly into a fixed radial position.

It is to be noted that the annular plate member imparts rigidity to the wheel body and is preferably fixed in position by the same bolt means employed for clamping the brake drum to the wheel spider. However, in the practice of the broader aspects of my invention, it is not essential that the same bolt securing means be used for clamping the annular plate member to the wheel, since it is within the scope of the present invention to employ a second set of bolts disposed around the wheel in addition to the bolt means that clamp the wheel spider and brake drum together. I therefore provide means whereby the brake drum and its associated annular closure plate may first be rigidly secured to the wheel body as a unit and then the clamping plate member may be easily and quickly mounted upon the wheel body by the same bolt means or, if desired, by a separate group of bolts.

Further, this plate member is readily removable and facilitates removal of the rim from the wheel spider independently of any of the associated structure of the wheel assembly. An important advantage secured by this construction is that the wheel may be quickly, accurately and positively assembled with the rim in predetermined fixed alinement thereon.

In addition, the present construction provides for substantially completely enclosing the wheel at both the inboard and outboard sides thereof. The brake drum and its associated closure disc close the inboard side of the wheel, while the annular plate that functions as the wedging and clamping means, together with the hub cap supported thereby, completely close the outboard side of the wheel.

An additional object of the invention is the provision of means for supporting the hub cap on the wheel assembly independently of the wheel spider.

A further object is to provide a clamping ring for a demountable rim which has secured thereto a molded or pressed hub cap formed of a suitable composition. This results in reducing the amount of metal used and this effects a material saving in amount of metal employed.

These and other objects and advantages of the present invention will be apparent to those skilled in the art from the following detailed description of a preferred embodiment of my invention, taken in conjunction with the accompanying drawings illustrating such a structure.

In the drawings:

Figure 1 is an elevational view of the inboard side of my improved wheel construction;

Figure 2 is a view similar to Figure 1, but of the outboard side of the wheel construction, with portions broken away;

Figure 3 is a vertical transverse sectional view through a portion of the wheel, taken substantially on line 3—3 of Figure 2, showing the manner in which the brake drum, rim and rim supporting means are mounted with respect to the wheel spider;

Figure 4 is a vertical sectional view through a spoke portion of a modified form of my improved wheel illustrating the manner in which an irregular drop center type of rim may be mounted upon the spoke ends of a wheel spider;

Figures 5 and 6 are vertical cross-sectional views of still further modifications illustrating my invention as applied to beveled-edge rims; and Figure 7 is a vertical cross-sectional view of a still further modified type of construction.

For purposes of illustration I have shown a five-spoke wheel, but it is to be understood that my invention is applicable to a wheel having any desired number of spokes.

Referring now in detail to the drawings, particularly Figures 1, 2 and 3, I have shown a wheel spider 5 having a plurality of radially extending integrally formed spoke members 6. Each spoke member has a reinforcing rib 7 extending from the hub portion of the spider outwardly to a point adjacent the spoke end, as clearly shown in Figures 2 and 3, for reinforcing the spider against vertical thrust. On the inboard side of each spoke member 6 there is formed a plurality of piloting shoulders 8 which, together with the radially inwardly extending flange portion 9 of the brake drum 10, form suitable means for alining the brake drum in fixed position on the spider 5. Secured between the flange 9 and the shoulder 8 is a flat annular plate 12 closing the inner end of the brake drum and provided with a central opening closely fitting the hub portion of the wheel body. The flange 9 and each of the spoke ends 6 are provided with openings receiving a bolt 13 which has a head portion 11 non-rotatably engaging the inner portion of the brake drum. A lock washer and nut 14 engage the outboard side of the spoke end 6 for securing the drum rigidly to the spider 5. When the nut 14 is tightened upon the bolt, the members 6 and 9 are drawn together and clamp therebetween the peripheral edge of the plate member 12.

It is to be noted that the flattened side of the head 11 of the bolt 13 engages a suitable boss formed on the brake drum 9 to prevent the bolt from rotating during assembling of the aforementioned parts. A shoulder 16 formed on the hub portion of the spider 5 is offset slightly with respect to the shoulder 8 whereby the inner peripheral edge of the plate 12 is similarly offset with respect to its outer peripheral edge whereby the member 12 is flexed in such manner as to prevent any vibration or rattling. It is apparent, therefore, that with the structure so far described I have provided a wheel completely closed on its inboard side.

Each of the spoke ends 6 is provided with a radially outwardly extending socket portion defined by the laterally spaced ribs 15 and the cylindrical segment 17 which receives the central portion 18 of the tire rim 19. The laterally spaced ribs 15 extend downwardly to a point approximately midway between the center of the wheel and its outer periphery.

The inboard side of each of the segments 17 is provided with an axially outwardly tapered shoulder 20 which is engaged by one of the tapered side wall portions defining the channel of the rim 19. The rim is provided with any desired type of drive lugs 22 which are adapted to engage the sides of predetermined spoke ends to prevent relative rotation between the rim and the wheel spider. In initial assembly of the ring onto the wheel spider, the rim is moved laterally over the spoke ends until it engages the shoulder 20.

The rim is moved into proper position with respect to the tapered shoulders 20 by means of an annular disc member 24 having circumferentially spaced recessed sockets 25 formed therein and provided with openings through which the bolt 13 extends.

The member 24 is provided with an axially inwardly tapered flange portion 26 around its peripheral edge which acts as a wedge or clamping means for moving the rim laterally into positive uniform engagement with the shoulders 20 of the wheel spider 6, and then serves to chord the rim outwardly into a fixed radial position upon further lateral inward movement of the member 24. I find that for practical purposes the flange 26 should be formed at an angle slightly less than the angle of the bevel surface of the channel of the rim. The inner peripheral edge portion of flange 26 is flattened to have positive laterally alining engagement along the outer cylindrical surface 17 of the spoke ends.

The member 24 has an offset inner portion terminating in a radially inwardly extending flange 27 defining a cylindrical lip which forms a suitable support for a hub cap 28. The hub cap 28 has an axially extending annular flange 29 extending within the lip 27, and may be provided with tangs or spring fingers 30 engaging the inner radial surface of the flange 27 of the annular disc member 24 for maintaining the hub cap in fixed position.

In order to remove the rim 19 from the wheel body it is only necessary to remove the nuts disposed in the sockets 25, of which there are five in the illustrated embodiment, and then withdraw the annular plate 24 outwardly. It is immaterial whether the hub cap 28 is removed separately or as a unit with the member 24. The hub cap 28 can be removed independently for inspection of the axle bearings or for lubricating purposes.

It will thus be seen that by this construction the outboard side of the wheel is substantially completely closed by the annular disc-like member 24 and the hub cap 25, and the member 24 in turn forms a rigid annular clamping means for maintaining the rim in fixed position upon the spoke ends of a wheel spider. Also, I have shown a structure in which only a single bolt disposed at each spoke on the wheel serves to maintain the brake drum, brake closure plate and wheel spider assembled as one unit and, in addition, provides a means for clamping the annular member 24 in place to thereby maintain the rim in fixed position. The member 24 is also utilized to provide means for locking the hub cap in position.

In Figure 4 I have illustrated an irregular drop center type of rim. Similar reference numerals in this modification indicate corresponding or identical parts described in connection with Figures 1, 2 and 3, to which reference should be had. The inboard sides of the spoke ends 17' of the wheel spider, in the present modification, are provided with axially outwardly tapered shoulders 20', similar to Figure 3, for engaging the corresponding tapered side wall portion 18' defining the channel of rim 19'. Although not shown, the rim is preferably provided with any desired type of drive lugs which, as in the preferred embodiment, are adapted to engage the sides of predetermined spoke ends to prevent relative rotation between the rim and the wheel spider. The rim is assembled onto the wheel spider, as before, the rim being moved laterally over the spoke ends until the surface 31 of the rim engages the shoulder 20'.

The outboard channel portion 32 of the rim 19' extends at a sharp angle substantially radially outwardly away from the wheel spider 17' and then is formed upward with a substantially axially extending portion 33, and from there on conforms in section opposite to that of the inboard portion of the rim.

The annular plate 24 has its outer periphery formed into a flange 34 suitable to engage the radially extending portion of the rim channel. When the plate member is tightened into position the flange 34 engages the rim, forcing the angular rim channel 31 to seat upon the tapered surface 20' of the wheel spider, and thus forces the rim into a fixed lateral and radially outwardly chorded position upon the wheel spider. In this modification I have shown a single bolt means at each spoke end for clamping the several parts together, but it is to be understood that my invention is not to be so limited since I may employ additional bolts disposed at other portions around the wheel spider, either singly or together, with the bolt means already described.

In Figures 5 and 6 I have illustrated my invention as applied to a beveled edge type of rim. Like reference numerals in these two illustrations indicate similar parts as described in connection with the preferred embodiment of my invention. In the present modification the wheel spider, brake drum flange, the bolt securing means and all ancillary construction is substantially identical to that shown and described in connection with Figures 1, 2 and 3, to which reference may be had.

Referring now to Figure 5, I have shown an inwardly extending beveled edge type of rim 36 having adjacent one edge an inwardly extending beveled gutter portion 37 adapted to seat upon a corresponding bevel surface 38 of the spoke extension 17' of the wheel spider 6. The annular plate member 24' has formed about its outer circumference an inwardly extending flange provided with a radial shoulder 39. The annular plate member is mounted upon the wheel as before, and when tightened into position the shoulder 39 positions the rim inwardly axially so that the beveled surface 37 of the rim rides up the correspondingly beveled surface 38 of the spoke extension to position the rim in proper fixed position and to radially chord the rim outwardly of the spoke end. It will be apparent that the rim is thus disposed in an inwardly overhanging position and that the center of load will be inwardly of the center of the wheel bearings. However, by varying the position of the beveled surface 38 of the spoke end and by varying the axial displacement of shoulder 39 of the annular plate 24, I may dispose the rim at any one of several inwardly overhanging positions, as desired.

In Figure 6 I have disclosed a beveled edge rim mounted on a wheel spider with the rim extending in an outwardly overhanging position. In this figure I have shown the beveled edge rim 40, which may be identical with rim 36, if desired, having its inner edge provided with a suitable internal beveled gutter surface 42 which is adapted to engage a corresponding beveled surface 43 formed at the outer peripheral edge of the annular plate member 24''. In this construction, the spider extension 17'' is formed with a shoulder 44 for engaging the inner lateral edge of the rim to maintain the rim in a fixed lateral position on the wheel spider. It is thus apparent that in this modification I have provided means whereby a beveled edge type of rim is maintained in an outwardly overhanging position, but employing substantially the same underlying principles of my invention as employed in the previously described forms of the invention. The wheel of the present modification is assembled in a manner similar to that described in connection with the construction shown in Figures 3 and 4. When the plate member 24'' is tightened into position on the bolts 13, the beveled surface 43 engages the beveled gutter 42 of the rim 40 and thus positions the rim in a fixed lateral and radially chorded position upon the spoke ends of the wheel spider.

Referring now in detail to Figure 7, I have disclosed in this embodiment of the invention a modified type of construction, in which the amount of metal employed to close the outboard side of the wheel assembly is materially reduced. Also, by this construction I provide means whereby various decorative effects may be produced at the outboard side of the wheel, without materially affecting the cost of construction.

In this embodiment of the invention I provide a wheel spider corresponding to that described in connection with Figures 1 to 3, upon which is mounted the brake drum 10 and a drop center type of rim 19 in the manner described in detail heretofore.

To secure the rim in position, I employ an annular clamping ring 53 having the peripherally flanged portion 54 tapered axially inwardly to engage the beveled surface of the rim for chording the same against the shoulders 20 formed at the spoke ends of the wheel spider. The annular member 53 may be chrome-plated or coated in any other suitable manner to provide a particular decorative appearance. However, instead of this member extending laterally outwardly as shown in Figure 3 and being provided with a radially inwardly extending flange 27, I provide for molding or otherwise forming into the enlarged cylindrical opening defined by the inner edge 55 of the member a hub cap indicated generally at 50, which may be secured thereinto in any suitable or desired manner, such as by the tongue and groove engagement indicated at 52, or by spring clips molded integrally therewith.

The hub cap 50 is preferably formed of a molded phenol condensation product, molded composition such as fiber or the like, or molded rubber. This provides a rigid hub cap of relatively low cost, molded integral with the annular metallic ring 53 which serves to clamp the rim in position. The hub cap, when scratched or bent, can be readily replaced at low cost, eliminating the cost of replacement of the more expensive plated types of hub caps now in use. The hub cap 50 may be provided with any desired decorative features, such as the annular grooves 56 or the like, which may be colored in a different manner from the exterior surface of the hub cap to provide for a contrasting color design, or any other suitable decorative appearance.

If desired, the hub cap 50 may also be molded out of resilient rubber and snapped or otherwise clipped to the inner defining edge of the ring 53. With a hub cap formed of such material, the danger of bending or scratching of the hub cap, when the car is parked adjacent a curb or the like, is materially reduced, since the hub cap yields under pressure and thus no damage is incurred if the same should come in contact with the curb. Such a hub cap is relatively inexpensive to form, and may be readily assembled and removed from the annular ring member in any desired manner. It is therefore to be understood that the present invention is not to be limited only to the use of metallic hub caps such as shown in Figure 3, but any rigid or non-rigid composition type of hub cap may be employed for this purpose, as shown in Figure 7.

Although I have described in detail the assembly as related to only one of the spoke ends of the wheel constructions disclosed, it is to be understood that the other of the spoke ends in the several modifications is similarly constructed and the wheel elements assembled thereto in the same manner. Obviously the same construction can be applied equally well to a six or eight spoke wheel, requiring only slight changes in the design of the member 24 and the location of the openings receiving the bolts 13.

While I have shown preferred forms only of my improved wheel assembly, I do not wish to be limited specifically thereto, or to the particular type of wheels described, as other modifications are possible within the scope of my invention.

I claim:

1. In combination, a wheel spider having radially extending spokes terminating in axially extending spoke ends, a rim having a beveled internal surface, a correspondingly beveled surface at each of said spoke ends, and an annular clamping plate having a peripheral channel-shaped flange covering the outboard portion of said spoke ends and having a defining edge engaging said rim for wedging said rim into radially chorded position on said spider, said plate being laterally tightened on said spider.

2. In combination, a wheel spider having radially extending spokes, cylindrical segmental surfaces at the ends of said spokes, beveled outwardly extending surfaces at the inboard side of each of said cylindrical surfaces, a tire rim having an internal beveled gutter surface engageable with said beveled outwardly extending surfaces, a plurality of projecting bolt means on said spoke ends disposed radially inwardly of said cylindrical surfaces, an annular ring member having circumferentially spaced laterally recessed socket portions secured to said bolt means and having an outer annular peripheral flange covering the outboard side of said spoke ends and abutting against the lateral surface of said rim to wedge said rim laterally of said spider and radially outwardly on said beveled surface, said ring member having a circular inner defining edge for receiving a hub cap adapted to be engaged in said edge and cooperating with said ring member to cover the outboard side of said wheel spider radially inwardly of said rim.

3. A wheel assembly of the class described in which the outboard side thereof is completely closed including an annular ring shaped clamping member having a channel-shaped peripheral flange for wedging a rim into chorded position on the wheel and constituting an annular closure extending inwardly of the rim, said ring member having an inner circular edge defining an opening centrally of said wheel assembly for receiving a hub cap supported about said edge to close said opening.

4. In a mounting for a drop center type tire rim, a wheel spider having radially extending spokes provided with axially tapered surfaces at the inboard side of the outer ends thereof, a ring-like clamping member having its outer portion extending over the outboard side of said spoke ends and terminating in an annular axially tapered flange engaging the outer ends of said spokes, a rim extending about said spoke ends and having a channel section defined by outwardly tapered surfaces, and means for drawing said clamping member inwardly to chord said rim radially outwardly by engagement of said axially tapered surfaces of said spokes and said flange with the outwardly tapered surfaces of said rim.

5. In a wheel, the combination of a wheel spider having radially extending spokes terminating in laterally extending spoke ends, a rim adapted to be mounted upon the spoke ends of said spider, an annular plate member adapted to be tightened on said spider and having a peripheral channel-shaped axially directed flange covering the outboard side of said spoke ends and including an edge portion for wedging said rim into fixed lateral position upon said spoke ends, said member forming an annular closure for said wheel between the rim and the central portion thereof and having an inner defining edge disposed radially outwardly of the hub of said spider for receiving a hub cap to complete the closing of the outboard side of said wheel.

6. A rim locking and wheel closure member comprising an annular disc having a peripheral channel-shaped flange terminating in an axially inwardly tapered flange edge adapted to wedge a rim into position about the spoke ends of a wheel spider, and having a radially inwardly directed portion provided with axially inwardly directed recesses adapted to receive means for securing said plate to said spider, said recesses being of sufficient depth to dispose said securing means substantially within the outer peripheral limits of said plate.

7. Means for clamping a tire rim in fixed position about the spoke ends of a wheel spider comprising an annular clamping member having its outer peripheral portion curved to provide an annular channel covering the outboard portions of said spoke ends and a radial outer zone of the spokes of said spider, and having the outer peripheral edge extending laterally inwardly over said spoke ends to clamp said rim to said spider, said member having an inner annular edge defining a circular opening for receiving a hub cap, and the intermediate portion of said member having axially inset circumferentially spaced recesses closed by an apertured radial wall adapted to receive securing means for mounting said member on said spider whereby said securing means does not project beyond the outer peripheral surface of said member.

8. A cover plate for a wheel assembly of the type having a rim supported on the spoke ends of a wheel spider, comprising an outer channel-shaped portion covering the outboard side of said spoke ends and having an axially directed tapered peripheral flange for wedging the rim in position on said spoke ends, an intermediate portion having axial recesses therein adapted to receive means for securing said plate to said spider, and an inner central portion covering the outboard side of the central zone of the spider and joined to said intermediate portion.

9. In combination, means for securing a tire rim of the drop center type to a wheel spider having spoke ends provided with inboard outwardly beveled rim seating surfaces and axially extending outboard surfaces, comprising an annular plate member having an axially directed channel-shaped peripheral flange engaging over the outboard surface of said spoke ends and terminating in a radially inwardly beveled edge for wedging said rim into position between said inboard beveled seating surface and said beveled flange edge, said plate member covering the outboard side of said spoke ends and extending radially inwardly to cover the outboard side of the radial outer zone of the spokes of said spider, bolt means carried by said spider and projecting toward the outboard side thereof, said plate member having an intermediate portion curved away from said spokes and provided with circumferentially spaced axially inset recesses having a radial back wall apertured to receive said bolt means, and nut means disposed within said recesses for clamping said plate member to said bolt means.

10. A cover plate for closing the outboard side of a wheel assembly of the type including a spoked wheel spider and a tire rim adapted to be mounted on the spoke ends thereof, comprising a relatively thin sheet metal stamping having an arched peripheral flange portion directed axially inwardly over said spoke ends for wedging said rim into fixed position on said spoke ends and covering the outboard side of said spoke ends and the radial outer zone of the spider spokes, said arched flanged portion being of sufficient rigidity due to the arching and flanging thereof to exert the desired wedging action without deflection, the intermediate portion of said plate member having axially inwardly depressed recesses receiving clamping means for moving the plate member axially inwardly to effect said wedging of said rim into position, and the central portion of said plate member comprising a concave disc-like portion covering the outboard side of the hub of said spider and the outboard side of the radial inner zone of said spokes.

FREDERICK W. BURGER.